US012712406B2

(12) United States Patent
Sullivan et al.

(10) Patent No.: US 12,712,406 B2
(45) Date of Patent: Aug. 18, 2026

(54) MOTOR ASSEMBLY WITH REDUCED THERMAL RESISTANCE

(71) Applicant: TACO, INC., Cranston, RI (US)

(72) Inventors: Steven K. Sullivan, Cranston, RI (US); Robert Birkenstock, Cranston, RI (US)

(73) Assignee: TACO, LLC, Cranston, RI (US)

( * ) Notice: Subject to any disclaimer, the term of this patent is extended or adjusted under 35 U.S.C. 154(b) by 0 days.

(21) Appl. No.: 19/022,771

(22) Filed: Jan. 15, 2025

(65) Prior Publication Data

US 2026/0204972 A1 Jul. 16, 2026

(51) Int. Cl.

| | |
|---|---|
| ***H02K 3/34*** | (2006.01) |
| ***F04D 29/58*** | (2006.01) |
| ***H02K 1/16*** | (2006.01) |
| ***H02K 15/106*** | (2025.01) |
| ***H02K 15/108*** | (2025.01) |

(52) U.S. Cl.

CPC ............... *H02K 3/345* (2013.01); *H02K 1/16* (2013.01); *F04D 29/5853* (2013.01); *H02K 1/165* (2013.01); *H02K 15/106* (2025.01); *H02K 15/108* (2025.01)

(58) Field of Classification Search

CPC combination set(s) only.
See application file for complete search history.

(56) References Cited

U.S. PATENT DOCUMENTS

| | | | | |
|---|---|---|---|---|
| 8,562,313 | B2 * | 10/2013 | Andersen | H02K 3/522 310/43 |
| 2009/0324435 | A1 * | 12/2009 | Sears | H02K 3/522 310/215 |
| 2010/0141079 | A1 * | 6/2010 | Chu | H02K 3/325 310/215 |
| 2015/0130386 | A1 * | 5/2015 | Zumstein | H02K 5/207 310/68 R |
| 2018/0205280 | A1 * | 7/2018 | Henry | H02K 3/18 |
| 2022/0140688 | A1 * | 5/2022 | Maurus | F04D 29/043 417/423.14 |
| 2023/0034953 | A1 * | 2/2023 | Martin | H02K 1/185 |
| 2023/0155430 | A1 * | 5/2023 | Beyerl | H02K 3/345 310/254.1 |
| 2024/0313591 | A1 * | 9/2024 | Bradfield | H02K 1/20 |

* cited by examiner

*Primary Examiner* — Binh Q Tran
(74) *Attorney, Agent, or Firm* — LOEB & LOEB LLP

(57) ABSTRACT

An insulating slot liner for an electric motor. The slot liner includes a body portion having an exterior side configured to be disposed adjacent to an interior surface of a stator of the electric motor and an interior side opposite the exterior side. The slot liner includes a first arm portion and a second arm portion each extending away from the interior side of the body portion so as to form a winding channel between the body portion, the first arm portion, and the second arm portion The slot liner includes one or more insulation openings formed in the body portion between the interior side and the exterior side so as to form a fluid connection between the winding channel and the interior surface of the stator.

20 Claims, 6 Drawing Sheets

MOTOR ASSEMBLY WITH REDUCED THERMAL RESISTANCE

TECHNICAL FIELD

The present disclosure relates to a motor assembly and, more specifically, to a systems and methods for improving thermal dissipation in a motor assembly.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Heat dissipation in electric motors may be important for improving and maintaining efficiency, performance, durability, reliability, and safety. For example, increased motor temperatures may raise the resistance of motor windings, converting more electrical energy into heat rather than mechanical energy and therefore reducing efficiency. Increased heat may also cause rotor expansion, which may lead to potential issues such as rubbing or binding with the stator, decreasing motor speed and torque. Accordingly, effective heat dispersion may significantly improve motor performance and reliability.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes an insulating slot liner for an electric motor. The slot liner may include a body portion having an exterior side configured to be disposed adjacent to an interior surface of a stator of the electric motor and an interior side opposite the exterior side. The slot liner may include a first arm portion and a second arm portion each extending away from the interior side of the body portion so as to form a winding channel between the body portion, the first arm portion, and the second arm portion. The slot liner may include one or more insulation openings formed in the body portion between the interior side and the exterior side so as to form a fluid connection between the winding channel and the interior surface of the stator.

In another embodiment, the disclosure describes a motor assembly comprising a stator having a circumferential interior surface. The motor assembly may include a plurality of stator teeth extending radially inward from the interior surface of the stator. The motor assembly may include a plurality of slots formed between pairs of adjacent stator teeth and the interior surface of the stator. The motor assembly may include a plurality of slot liners, each slot liner of the plurality of slot liners disposed within one of the plurality of slots. Each slot liner may include a body portion having an exterior side disposed against the interior surface and an interior side opposite the exterior side, a first arm portion disposed against a first stator tooth of the plurality of stator teeth, a second arm portion disposed against a second stator tooth of the plurality of stator teeth, the second stator tooth being adjacent to the first stator tooth, and one or more insulation openings formed in the body portion between the interior side and the exterior side so as to form a fluid connection between each respective slot of the plurality of slots and the interior surface of the stator.

In another embodiment, the disclosure describes a pump system for pumping a fluid. The pump system may include a pump housing including an inlet conduit configured to convey the fluid into the pump housing and an outlet conduit configured to convey the fluid out of the pump housing. The pump system may include an electric motor assembly including a stator. The pump system may include a shaft extending out of the stator and into the pump housing. The electric motor assembly may be configured to rotate the shaft with respect to the electric motor and the pump housing. The pump system may include an impeller disposed on the shaft and within the pump housing in fluid communication with the inlet conduit and the outlet conduit. The impeller may be configured to rotate within the pump housing in response to the shaft so as to convey the fluid out of the outlet conduit. The stator may include a plurality of stator teeth extending radially inward and spaced from one another to form a plurality of slots, and a plurality of slot liners each disposed within one of the plurality of slots. Each of the plurality of slot liners may include one or more insulation openings disposed so as to form a fluid connection between the respective slot and the stator.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

DETAILED DESCRIPTION

Figure 1:
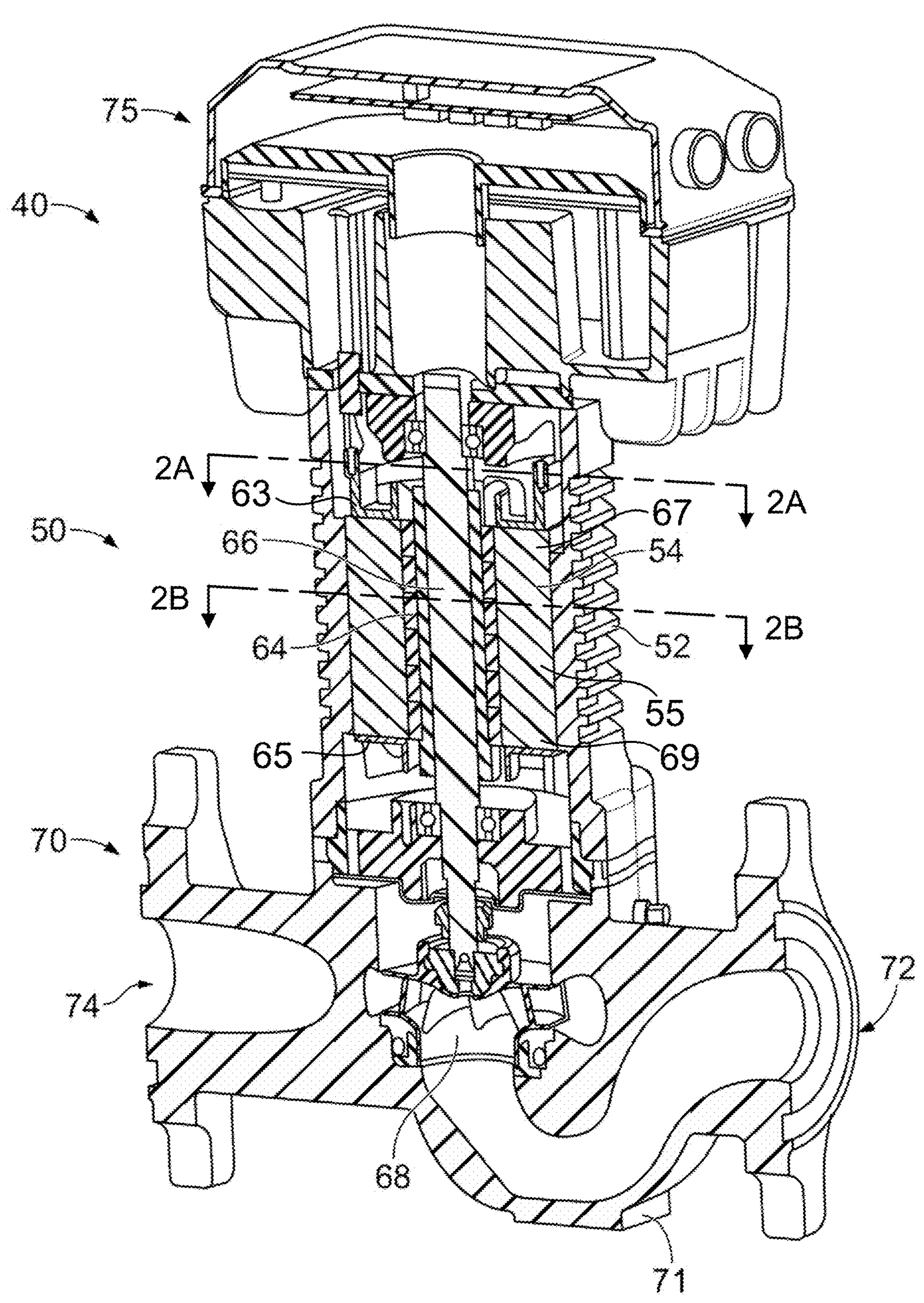
FIG. 1 is a sectional view of an embodiment of a pump system including an embodiment of a motor assembly with reduced thermal resistance in accordance with the disclosure.

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. The following detailed description is, therefore, not to be taken in a limiting sense.

The figures depict preferred embodiments for purposes of illustration only. One skilled in the art will readily recognize from the following discussion that alternative embodiments of the structures and methods illustrated herein may be employed without departing from the principles described herein.

In some motor assembly embodiments, the motor's thermal resistance between its magnet wire windings and atmosphere may influence the motor's heat dissipation and therefor its power density and performance limit. In other words, a motor's performance may be improved if thermal resistance may be reduced in a way that increases heat dissipation. Traditionally, dissipation of heat from a motor's windings during operation may be constrained by the high thermal resistance of air around the windings and insulation material (e.g., NOMEX paper insulation, plastic, etc.) between windings and a metal stator and/or a housing of the motor. Traditional methods of improving thermal conductivity in motors may only address high thermal resistance in an axial direction, and not in a radial direction.

In some embodiments, the disclosure describes providing one or more insulting slot liners that may include one or more openings disposed in the slot liners between the stator windings and a metallic stator and/or a motor housing. In some embodiments, the insulation openings may be filled with a high thermal conductivity material (e.g., potting material) that may directly contact an adjacent metallic stator between windings. Accordingly, a radial heat transfer path from the stator wire windings to ambient air surrounding the stator and/or housing may be shorter and more direct, which may further reduce thermal resistance and improve power density and performance of the motor. In some embodiments, the insulation openings may be one or more openings disposed along an entire length of the stator to help maximize the increased thermal conductivity, or may be a single long opening. In such embodiments, the insulation openings may increase thermal conductivity in a radial direction while the slot liner itself still provides lateral structural integrity that may help limit damage or movement of the slot liner during the magnet wire winding process.

Generally, increasing the power density (i.e., power per volume) of a motor may increase the heat generated by that motor. In addition to decreasing motor performance and/or efficiency, there may also be practical limitations to motor temperatures that may not be exceeded in practice (e.g., temperature ratings, material property limitations, etc.). Increasing thermal conductivity, such as by implementing the motor assembly and slot liners disclosed herein, may result in more effective cooling of the motor assembly, which may allow the motors to run cooler for any given power density. Accordingly, the disclosed slot liners may enable motors to operate at lower temperatures and/or to use more power dense motors without exceeding temperature limits.

Accordingly, in some embodiments, the disclosure describes motor assemblies and methods that may decrease thermal resistance, thereby improving cooling capabilities and improving motor efficiency. FIG. 1 shows an embodiment of a pump system 40 that may include a motor assembly 50 with reduced thermal resistance as disclosed herein. In some embodiments, the pump system 40 may be used for moving a fluid, such as water, through a heating and/or cooling system. In some embodiments, the pump system 40 may be used for moving fluid in any number of suitable applications known to those skilled in the art. Those skilled in the art will also appreciate that, while the motor assembly 50 is described herein as used in a pump system, the disclosed motor assembly includes features and benefits that may be used in many other suitable applications.

The pump assembly 40 may additionally include a terminal box 75 disposed on a first end of the motor assembly 50 and a pump housing 71 for a piping system 70 disposed on a second end of the motor assembly 50 opposite the first end. The terminal box 75 may house an electronic control card or other electrical and/or control components for the pump system 40. The motor assembly 50, described in further detail below in FIGS. 2A and 2B, may include a housing 52, which may be made from aluminum, plastic, or other suitable material. The motor assembly 52 may also include a lamination stack or stator 54, which may be made of steel in some embodiments, and may include one or more stator teeth 55, and a rotor 64 configured to rotate within the housing in response to magnetic fields produced by current flowing through stator windings wrapped around the stator teeth. The rotor 64 may be connected to a shaft 66 that may extend beyond the second end of the motor assembly 50 and into the pump housing 71. In some embodiments, the shaft 66 may be connected to an impeller 68, which may be disposed within the pump housing 71 between an inlet conduit 72 and an outlet conduit 74. In some embodiments, the rotating rotor 64 may rotate the shaft 66, which may rotate the impeller 68. The impeller 68 may be configured to supply a head to a fluid flowing into the inlet conduit 72, through the impeller, and out of the outlet conduit 74.

Figure 2A:
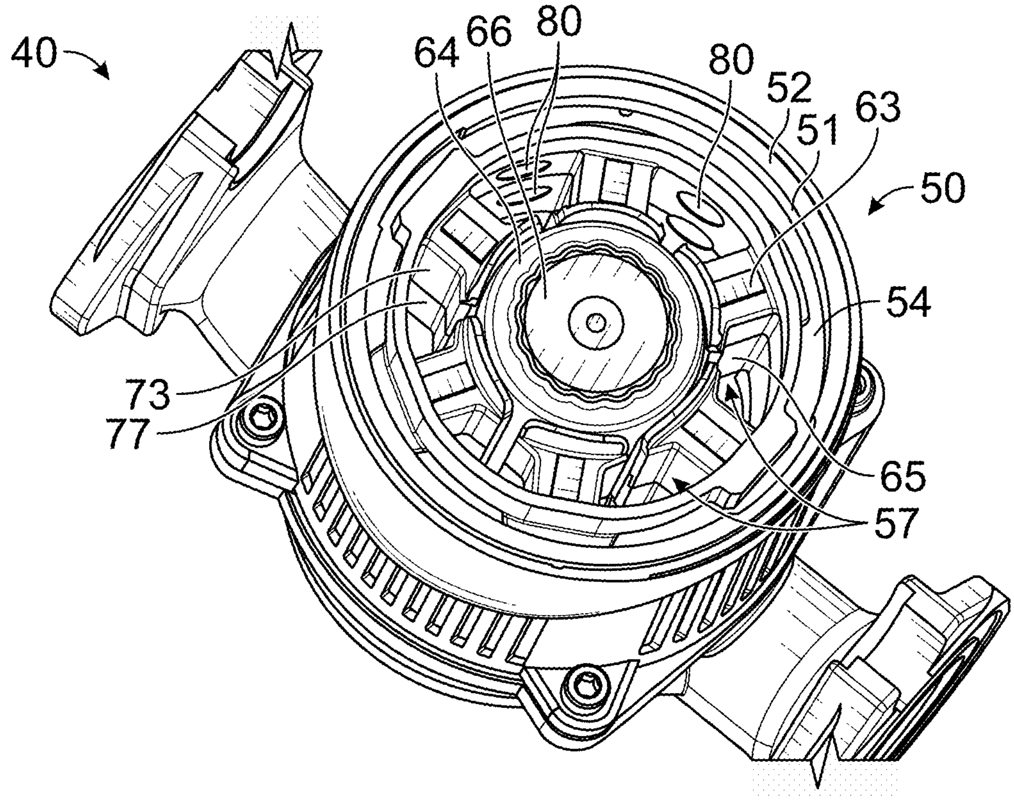
FIG. 2A is sectional view of the pump system of FIG. 1.
Figure 2B:
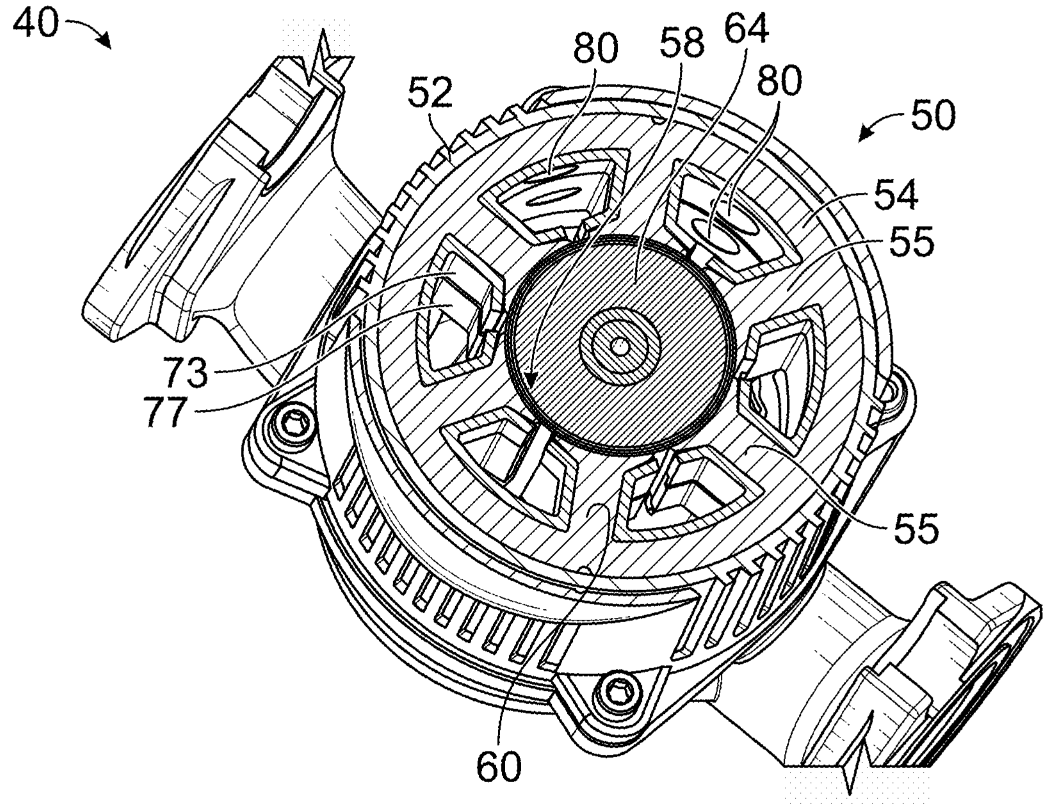
FIG. 2B is another sectional view of the pump system of FIG. 1.

FIGS. 2A and 2B show sectional views of the pump system 40 shown from above, with sections 2A and 2B taken as indicated in FIG. 1. As shown, the motor assembly 50 may include a housing 52, a lamination stack or stator 54 within an interior surface 51 of the housing and extending radially inward from the interior surface. In some embodiments, as shown in FIG. 2B, the stator 54 may be substantially circumferential and may include one or more stator teeth 55. In some embodiments, the stator 54 and the stator teeth 55 may be made of stacked laminated steel (or other metal) sheets that may reduce eddy current losses. In some embodiments, distal ends 60 of the stator teeth 55 may define a rotor orifice 58 within the stator 54 which may house the rotor, such as rotor 64. In some embodiments, slots 57 may be formed between each adjacent stator 55, which may provide space for the stator windings (see, e.g., stator windings 56 in FIG. 3B.

In some embodiments, a first end cap 63 may be disposed so as to substantially cover a top portion 67 of the one or more stator teeth 55 and a second end cap 65 may be disposed so as to substantially cover a bottom portion 69 of the one or more stator teeth. In some embodiments, the first and second end caps 63, 65 may be made from plastic or other suitable material. In some embodiments, the first end cap 63 may have first end cap walls 73 that may extend downward into the slots 57 adjacent each respective stator 55, and the second end cap 65 may have second end cap walls 77 that may extend upward into the slots toward the first end cap walls. In some embodiments, the first end cap walls 73 and the second end cap walls 75 may extend toward one another so as to make contact with one another or otherwise substantially cover the entire length of each of the one or more stator teeth 55 between the top portion 67 and the bottom portion 69 of each of the stator teeth. In some embodiments, the first and second end caps 63, 65 may substantially electrically insulate the stator 54 and/or the one or more stator teeth 55 from contacting the motor windings wound around each of the one or more stator teeth, thereby forming a primary insulation system preventing or reducing electrical shorts between the motor windings and the stator 54 and/or the one or more stator teeth 55. In some embodiments, it is contemplated that the primary insulation system may include first and second end caps 63, 65 that may be integrally connected to one another thereby forming a substantially solid insulation barrier. It is also contemplated that the first end cap walls 73 may extend substantially the entire length of the one or more stator teeth 55, or vice versa with the second end cap walls 77.

In some embodiments, the primary insulation system may include one or more insulation openings 80 that may provide fluid and/or thermal communication between the stator windings 56, the slots 57, and the stator 54, and eventually to ambient air. In some embodiments, the insulation openings 80 may be formed through portions of the first end cap walls 73, the second end cap walls 77, or both. Although the embodiment shown in FIGS. 2A and 2B only shows insulation openings 80 corresponding to two of the slots 57, it is contemplated that one or more insulation openings may be formed through the primary insulation system forming fluid and/or thermal communication between each slot 57 and the stator 54. Additionally, while two insulation openings 80 are shown in FIGS. 2A and 2B corresponding to each respective slot 57, it is contemplated that any number of insulation openings may be formed between the slot 57 and the stator 54 for each slot, similar to as described herein with respect to the slot liner 100 shown and described with respect to FIGS. 4-6. In some embodiments, it is contemplated that the primary insulation system may include a single, elongated insulation opening 80 through the first and/or second end cap walls 73, 75 within each slot 57, or that there may be multiple insulation openings having different shapes/sizes. Similar as described below with reference to the slot liner 100, it is contemplated that the insulation openings 80 may be virtually any quantity, size, and/or shape that may allow effective thermal communication between each respective slot 57, the stator 54, and eventually the housing 52 and the ambient air.

In some embodiments, one or more of the slots 57 between each adjacent stator 55 and corresponding stator winding may be at least partially filled with a thermally conductive material (shown in FIG. 3B as thermally conductive material 62), such as epoxy resin, silicone rubber gel, polyurethane, etc. In some embodiments, the thermally conductive material may have voltage blocking attributes, and may replace the air that would otherwise fill the slots 57 and surround the stator windings 56. In some embodiments, the thermally conductive material 62 may contact both the stator windings 56 and the stator 54 through the one or more insulation openings 80. Accordingly, the thermally conductive material 62 may improve heat transfer from the stator windings to the stator 54, particularly as compared to a less thermally conductive substance, such as air. In some embodiments, the stator 54 may be made from a thermally conductive material, such as steel, and the housing 52 may be made from a thermally conductive material such as aluminum, aluminum alloy, or other suitable metallic material. Accordingly, in some embodiments, the heat may be transferred from the stator windings 56, through the insulation openings 80 in the primary insulation system via the thermally conductive material 62, to the stator 54, to the housing 52, and into the ambient surrounding environment.

In some embodiments, the motor assembly 50 may additionally include a fan (not shown) that may push or pull air axially through the stator 54, through the slots 57 and adjacent the stator windings 56, and the primary insulation system. The fan may be used in embodiments that include thermally conductive material 62 or without, or may be used in embodiments where some but not all of the slots 57 may be filled with thermally conductive material. In such embodiments that include a fan, the moving air may increase heat transfer away from the stator windings 56, through the insulation openings 80, and to the stator 54 and housing 52 for dissipation to the ambient environment, thereby reducing thermal resistance.

Figures 3A, 3B:
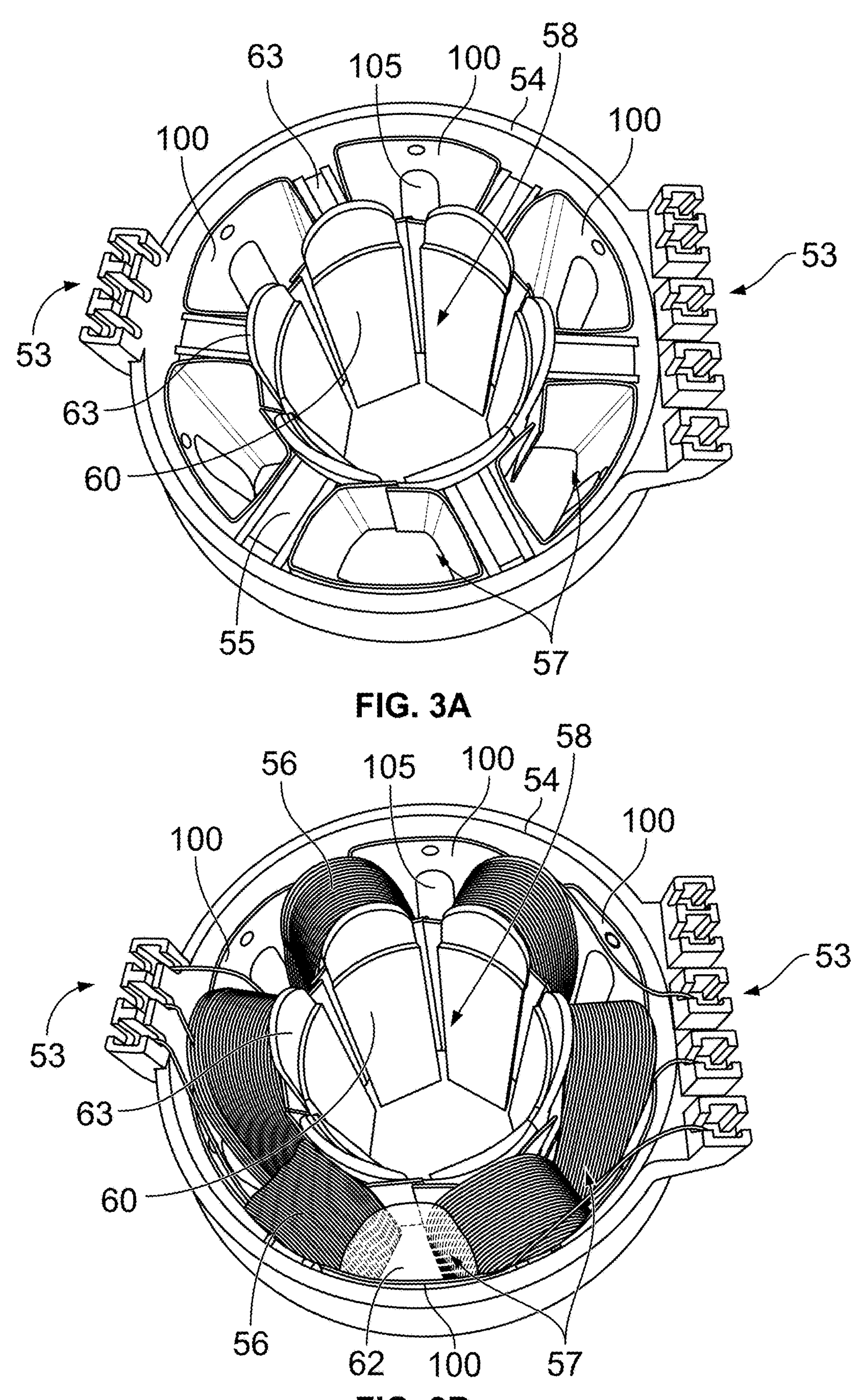
FIG. 3A is an embodiment of a stator with reduced thermal resistance in accordance with the disclosure.
FIG. 3B is the stator of FIG. 3A additionally illustrating stator windings.

FIGS. 3A and 3B show another embodiment of a primary insulation system (i.e., slot liners 100) disposed within the stator 54 and providing thermal communication between each slot 57 and the stator 54. A plurality of stator teeth 55 disposed around an interior surface 51 of the housing and may extend radially inward, and one or more terminals 53 may provide an electrical connection between stator windings 56 and a power source. In some embodiments, distal ends 60 of the stator teeth 55 may define a rotor orifice 58 in the lamination stack or stator 54 which may house a rotor, such as rotor 64 shown in FIGS. 1, 2A, and 2B. The first end cap 63 may be disposed on the top portion 67 of the stator teeth 55, and may be made from plastic or other suitable material. The slots 57 may be formed between each adjacent stator 55, which may provide space for the stator windings and which may house a primary insulation system in the form of one or more slot liners 100, which are described in greater detail with respect to FIGS. 4-6. The slot liners 100 may form an electrically insulated barrier between the stator windings 56, the stator teeth 55, and the stator 54, and may prevent or reduce electrical shorts.

As shown in FIG. 3B, the stator windings 56 may be coils of wire wound around each stator 55. These windings 56 may be arranged in a variety of configurations, such as in two-phase or a three-phase configuration, to create a rotating magnetic field when powered. In some embodiments, the stator windings 56 may be made from a metallic material, such as copper, copper alloy, aluminum, aluminum alloy, etc., although those skilled in the art will appreciated that other materials may be used as well consistent with the teachings of the disclosure. As shown in FIG. 1, but omitted from FIGS. 3A and 3B for the sake of clarity, the motor assembly 50 may also include a rotor 64 housed within the rotor orifice 58. The rotor may include magnets that interact with the magnetic field generated by the stator windings 56 to produce rotation of the rotor 64, which may rotate a shaft (such as the shaft 66 shown in FIG. 1) connected to the rotor. In some embodiments, the shaft may extend outside the housing 52, transmitting mechanical energy to a load (e.g., a fluid in a pipe system).

In some embodiments, the slot liners 100 may be disposed in one or more of the slots 57 such that each slot liner may substantially surround the slots 57, substantially covering an interior surface of the stator 54 the stator teeth 55. As described in more detail related to FIGS. 4-6, one or more of the slot liners 100 may include one or more insulation openings 105, that may provide fluid and/or thermal communication between the stator windings 56, the slots 57, and the stator 54, to the motor housing (such as the housing 52), then to ambient air. As shown in FIG. 3B, in some embodiments, the stator windings 56 may be wrapped around a portion of the slot liner 100, such that the slot liners and the first end cap 63 may form an insulating layer between the stator teeth 55 and the stator windings. In some embodiments, the slot liners 100 may be made from and may be made from an insulating or high-temperature resistant material, such as NOMEX and/or Mylar, but those skilled in the art will recognize that other suitable materials may be used as well.

In some embodiments, one or more of the slots 57 between each adjacent stator 55 and corresponding stator winding 56 may be at least partially filled with a thermally conductive but electrically isolating material 62, such as potting material, epoxy resin, silicone rubber gel, polyurethane, etc. In some embodiments, the thermally conductive material 62 may be thermoplastic or thermoset, and may have dielectric properties. In some embodiments, the thermally conductive material 62 may have voltage blocking attributes, and may replace the air that would otherwise surround the stator windings 56. The potting material 62 may contact both the stator windings 56 and the stator 54 through the one or more insulation openings 105 in the slot liners 100. Accordingly, the thermally conductive material 62 may improve heat transfer from the stator windings 56 to the housing 52, particularly as compared to a less thermally conductive substance, such as air. In some embodiments, the housing 52 may be made from a thermally conductive material, such as aluminum, aluminum alloy, or other suitable metallic material, and the stator 54 may be formed from steel. The heat may be transferred from the stator windings 56, through the slot liners 105 via the thermally conductive material 62, to the stator 54, to the housing 52, and into the ambient surrounding environment.

In some embodiments, the entire stator 54 may be overmolded with the thermally conductive material 62 such that all or substantially all of the stator may be covered with the thermally conductive material. In some such embodiments, the overmolded thermally conductive material 62 may replace the housing 52 altogether, may be disposed within the housing, or may cover the housing also in other embodiments. In some embodiments, heat may be allowed to dissipate from the windings 56, through the thermally conductive material 62, through the insulation openings 105 (or insulation openings 80), to the stator 54, through the overmolded thermally conductive material, and into the ambient air.

In some embodiments, the motor assembly 50 may additionally include a fan (not shown) that may push or pull air axially through the housing 52, through the slots 57 and adjacent the motor windings 56, the slot liners 100, and the interior surface 51 of the housing. The fan may be used in embodiments that include thermally conductive material 62 or without, or may be used in embodiments where some but not all of the slots 57 may be filled with potting material. In such embodiments that include a fan, the moving air may increase heat transfer away from the stator windings 56, through the insulation openings 105, and to the housing 52 for dissipation to the ambient environment, thereby reducing thermal resistance.

Figure 4:
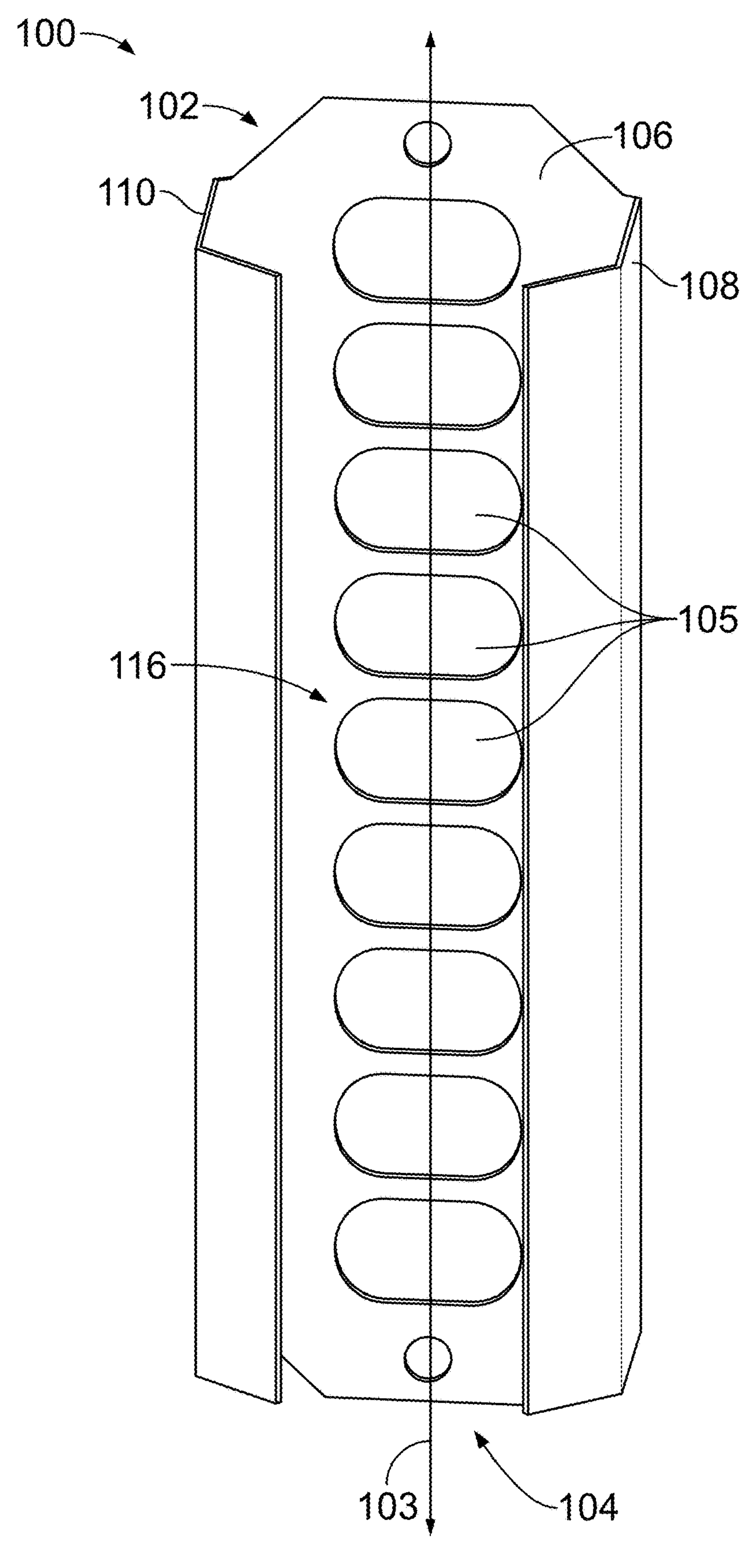
FIG. 4 is a perspective view of a slot liner of the stator of FIG. 3A.
Figures 5, 6:
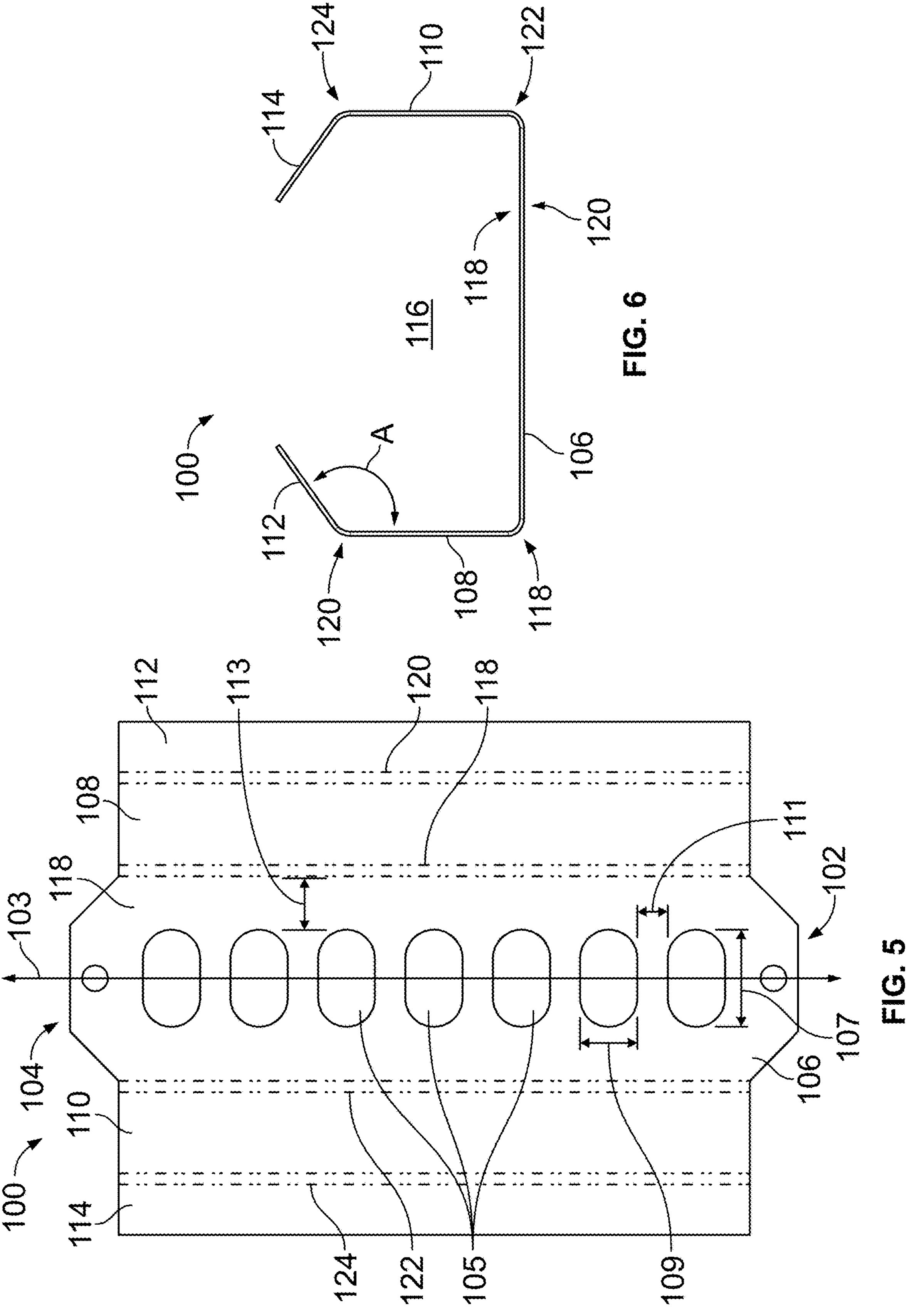
FIG. 5 is a front view of the slot liner of FIG. 4.
FIG. 6 is a top view of the slot liner of FIG. 4.

FIGS. 4-6 show an embodiment of a slot liner 100 with one or more insulation openings 105 formed through it. The slot liner 100 may include a first end 102 and a second end 104 opposite one another along a vertical axis 103. In some embodiments, the slot liner 100 may include a body portion 106, a first arm portion 108, and a second arm portion 110. The body portion 106 may be substantially flat between the first end 102 and the second end 104, but may be formed in non-flat configurations in other embodiments. Each of the first and second arm portions 108, 110 may extend from opposite sides of the body portion 106 at substantially right angles to the body portion. In some embodiments, a distal end 112 of the first arm portion 108 may extend at an angle away from the first arm portion, and a distal end 114 of the second arm portion 110 may extend at an angle away from the second arm portion. In some embodiments, the distal end 112 of the first arm portion 108 and the distal end 114 of the second arm portion 110 may be formed so as be angled toward one another, such that an angle A is formed with respect to the respective first and second arm portions. In some embodiments, angle A may be 125 degrees, or may be between about 90 degrees and about 180 degrees in other embodiments, or may be between about 110 degrees and about 160 degrees in other embodiments. In some embodiments, the body portion 106, the first arm portion 108, and the second arm portion 110 may form a winding channel 116 between them running a vertical length of the slot liner 100.

Referring to FIGS. 5 and 6, the body portion 106 and the first arm portion 108 may be connected at a seam or fold 118, and the first arm portion and the distal end 112 of the first arm portion may be connected at a seam or fold 120. Similarly, the body portion 106 and the second arm portion 110 may be connected at a seam or fold 122, and the second arm portion and the distal end 114 of the second arm portion may be connected at a seam or fold 124. In some embodiments, when constructed, the slot liner 100 may be substantially symmetrical about a vertical axis 103 running between the first end 102 of the body portion 106 and the second end 104 of the body portion.

In some embodiments, when disposed within a slot 57 (such as shown in FIGS. 3A and 3B), the body portion 106 may be disposed substantially flush against the interior surface of the stator 54. However, in some embodiments, a gap between the body portion 106 and the stator 54 may also exist. In some embodiments, the first arm portion 108 may be disposed substantially flush against one of the plurality of stator teeth 55, and the second arm portion 110 may be disposed substantially flush against an adjacent one of the plurality of stator teeth. In some embodiments, when disposed within a slot 57 of a stator 54, the slot liner 100 may be aligned with the stator 54 and stator teeth 55 such that the winding channel 116 and the slot 57 may be co-axial and define substantially the same space. In some embodiments, each slot liner 100 may cover an axial distance (e.g., along the vertical axis 103) along the stator 54 that may be substantially equivalent to the axial length of the one or more stator teeth 55. In some embodiments, each slot liner 100 may cover an axial distance along the stator 54 that may be greater than the axial length of the one or more stator teeth 55. In some embodiments, each slot liner 100 may cover an axial distance along the stator 54 that may be less than the axial length of the one or more stator teeth 55. In some embodiments, when disposed within a slot 57 of the stator 54, the distal end 112 of the first arm portion 108 may be disposed substantially flush against the distal end 60 of a stator tooth 55 of the plurality of stator teeth, and the distal end 114 of the second arm portion 110 may be disposed substantially flush against an adjacent stator tooth 55 of the plurality of stator teeth. In some embodiments, the respective distal ends 112, 114 may meet or substantially meet so as to form a substantially closed winding channel 116.

As shown in FIG. 6, in some embodiments, the body portion 106 of the slot liner 100 may include an interior side 118 and an exterior side 120. In some embodiments, the one or more insulation openings 105 may be formed through the body portion 106 between the interior side 118 and the exterior side 120 so as to provide a fluid connection between the winding channel 116 and the exterior of the slot liner 100 (e.g., the stator 54). In some embodiments, the one or more insulation openings 105 may have opening dimensions, such as an opening width 107 and an opening height 109. In some embodiments, the opening height 109 measured along the vertical axis 103 may be less than or equal to the opening width 107 measured perpendicular to the vertical axis. In some embodiments, the opening height 109 measured along the vertical axis 103 may be greater than or equal to the opening width 107 measured perpendicular to the vertical axis. In some embodiments, the insulation openings 105 may be substantially oval in shape with major and minor diameters, but may take other shapes in other embodiments consistent with the disclosure. In some embodiments, the insulation openings 105 may be oblong in shape, having two curved, semicircular ends opposite one another, and having substantially flat portions connecting the semicircular ends. In some embodiments, the insulation openings 105 may be other shapes, such as circles, rectangles, squares, hexagons, etc., within the meaning of the disclosure. In some embodiments, the one or more insulation openings may be separated from one another along the vertical axis 103 by an offset distance 111

In some embodiments, the one or more insulation openings 105 may extend substantially the entire distance between the first end 102 of the body portion 106 and the second end 104 of the body portion. In some embodiments, the one or more insulation openings 105 may be disposed spaced from one another in an array along the vertical axis 103. In some embodiments, the insulation openings 105 may be evenly and regularly spaced from one another along the vertical axis 103 (i.e., in the direction between the first and second ends 102, 104 of the body portion), or may be more unevenly spaced. In some embodiments, the vertical distance between each of the one or more insulation openings 105 may be less than the vertical span of each insulation opening, or may be more than the vertical span of each insulation opening in other embodiments. In some embodiments, each of the one or more insulation openings 105 may be uniformly shaped with respect to one another, or in some embodiments the insulation openings may have variable shapes. In some embodiments, each of the one or more insulation openings 105 may be substantially vertically aligned with one another, or in some embodiments the insulation openings may be horizontally staggered or a combination of aligned and staggered. In some embodiments, the one or more insulation openings 105 may be formed through the body portion 106 such that a horizontal distance 113 between the folds 118, 122 and an edge of each insulation opening may be a minimum distance to allow for motor windings or other motor assembly hardware.

In some embodiments, the spaces formed by the one or more insulation openings 105 may, in total, make up about 50 percent of the distance between the first and second ends 102, 104 of the slot liner 100. In some embodiments, the spaces formed by the one or more insulation openings 105 may, in total, make up about 60 percent of the distance between the first and second ends 102, 104 of the slot liner 100, or 75 percent in other embodiments, or 85 percent in yet other embodiments, or 90 percent in yet other embodiments. In some embodiments, the insulation openings 105 may be formed such that, while in place within the slots 57 of the housing 52, the stator windings 56 do not overlap the insulation openings 105 in a radial direction. In other words, in such embodiments, the stator windings 56 may not overlap the respective edges of the insulation openings 105. In some embodiments, however, the insulation openings 105 may be shaped such that the stator windings 56 extend past the lateral edge of the insulation openings thereby overlapping he insulation openings. In some embodiments, the insulation openings 105 may be formed in the slot liners 100 such that, when disposed within the slots 57, the insulation openings do not extend beyond a top end or bottom end of each stator tooth 55 in along the vertical axis 103. In other words, in such embodiments, the insulation openings 105 may be disposed fully within the slots 57 along the vertical axis 103.

Figure 7:
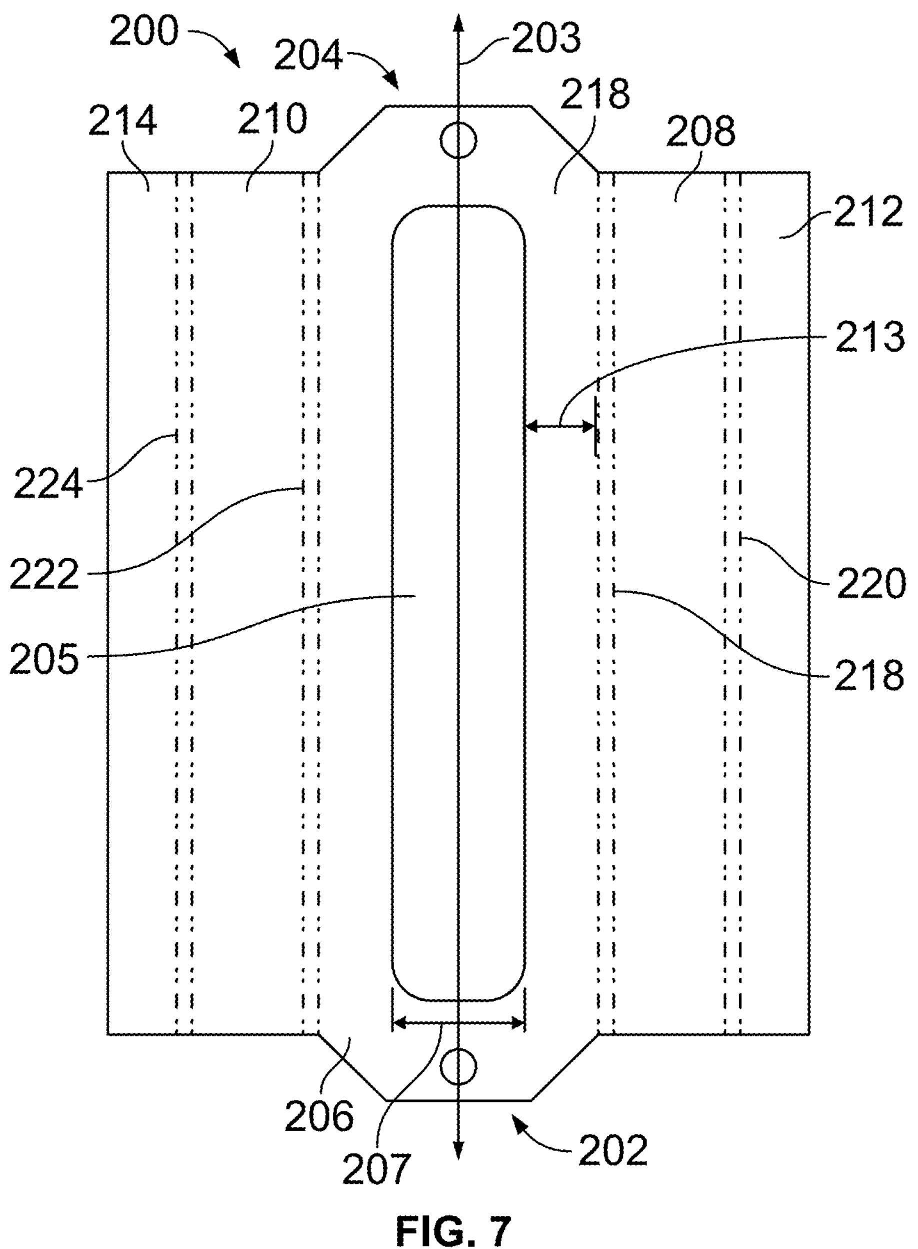
FIG. 7 is a front view of another embodiment of a slot liner.

FIG. 7 shows another embodiment of a slot liner 200 similar to slot liner 100 but with a single insulation opening 205 formed through it that may runs substantially the entire length of the stator teeth. The slot liner 200 may include a first end 202 and a second end 204 opposite one another along a vertical axis 203. In some embodiments, the slot liner 200 may include a body portion 206, a first arm portion 208, and a second arm portion 210. The body portion 206 may be substantially flat between the first end 202 and the second end 204, but may be formed in non-flat configurations in other embodiments. Each of the first and second arm portions 208, 210 may extend from opposite sides of the body portion 206 at substantially right angles to the body portion. In some embodiments, a distal end 212 of the first arm portion 208 may extend at an angle away from the first arm portion, and a distal end 214 of the second arm portion 210 may extend at an angle away from the second arm portion. In some embodiments, the distal end 212 of the first arm portion 208 and the distal end 214 of the second arm portion 210 may be formed so as be angled toward one another. In some embodiments, the body portion 206, the first arm portion 208, and the second arm portion 210 may form a winding channel 216 between them running a vertical length of the slot liner 200.

The body portion 206 and the first arm portion 208 may be connected at a seam or fold 218, and the first arm portion and the distal end 212 of the first arm portion may be connected at a seam or fold 220. Similarly, the body portion 206 and the second arm portion 210 may be connected at a seam or fold 222, and the second arm portion and the distal end 214 of the second arm portion may be connected at a seam or fold 224. In some embodiments, when constructed, the slot liner 200 may be substantially symmetrical about a vertical axis 203 running between the first end 202 of the body portion 206 and the second end 204 of the body portion.

In some embodiments, when disposed within a slot 57 (such as shown in FIGS. 3A and 3B), the body portion 206 may be disposed substantially flush against the interior surface of the stator 54. However, in some embodiments, a gap between the body portion 206 and the interior surface may also exist. In some embodiments, the first arm portion 208 may be disposed substantially flush against one of the plurality of stator teeth 55, and the second arm portion 210 may be disposed substantially flush against an adjacent one of the plurality of stator teeth. In some embodiments, when disposed within a slot 57 of the stator 54, the slot liner 200 may be aligned with the stator and stator teeth 55 such that the winding channel 216 and the slot 57 may be co-axial and define substantially the same space. In some embodiments, each slot liner 200 may cover an axial distance (e.g., along the vertical axis 203) along the stator 54 that may be substantially equivalent to the axial length of the one or more stator teeth 55. In some embodiments, each slot liner 200 may cover an axial distance along the stator 54 that may be greater than the axial length of the one or more stator teeth 55. In some embodiments, each slot liner 200 may cover an axial distance along the stator 54 that may be less than the axial length of the one or more stator teeth 55. In some embodiments, when disposed within a slot 57 of the stator 54, the distal end 212 of the first arm portion 208 may be disposed substantially flush against the distal end 60 of a stator tooth 55 of the plurality of stator teeth, and the distal end 214 of the second arm portion 210 may be disposed substantially flush against an adjacent stator tooth 55 of the plurality of stator teeth. In some embodiments, the respective distal ends 212, 214 may meet or substantially meet so as to form a substantially closed winding channel 216.

In some embodiments, the insulation opening 205 may be formed through the body portion 206 between so as to provide a fluid connection between the winding channel 216 and the exterior of the slot liner 200 (e.g., the stator 54). In some embodiments, the insulation opening 205 may have opening dimensions, such as an opening width 207 and an opening height 209. In some embodiments, the opening height 209 measured along the vertical axis 203 may be less than or equal to the opening width 207 measured perpendicular to the vertical axis. In some embodiments, the opening height 209 measured along the vertical axis 203 may be greater than or equal to the opening width 207 measured perpendicular to the vertical axis. In some embodiments, the insulation opening 205 may be substantially oval in shape with major and minor diameters, but may take other shapes in other embodiments consistent with the disclosure. In some embodiments, the insulation opening 205 may be oblong in shape, having two curved, semicircular ends opposite one another, and having substantially flat portions connecting the semicircular ends. In some embodiments, the insulation opening 205 may be other shapes, such as circles, rectangles, squares, hexagons, etc., within the meaning of the disclosure. In some embodiments, the one or more insulation openings may be separated from one another along the vertical axis 203 by an offset distance 211

In some embodiments, the insulation opening 205 may extend substantially the entire distance between the first end 202 of the body portion 206 and the second end 204 of the body portion. In some embodiments, the insulation opening 205 may be formed through the body portion 206 such that a horizontal distance 213 between the folds 218, 222 and an edge of the insulation opening may be a minimum distance to allow for motor windings or other motor assembly hardware.

In some embodiments, the space formed by the insulation opening 205 may, in total, make up about 50 percent of the distance between the first and second ends 202, 204 of the slot liner 200. In some embodiments, the space formed by the insulation opening 205 may, in total, make up about 60 percent of the distance between the first and second ends 202, 204 of the slot liner 200, or 75 percent in other embodiments, or 85 percent in yet other embodiments, or 90 percent in yet other embodiments. In some embodiments, the insulation opening 205 may be formed such that, while in place within the slots 57 of the stator 54, the stator windings 56 do not overlap the insulation opening 205 in a radial direction. In other words, in such embodiments, the stator windings 56 may not overlap the respective edges of the insulation opening 205. In some embodiments, however, the insulation opening 205 may be shaped such that the stator windings 56 extend past the lateral edge of the insulation openings thereby overlapping he insulation openings. In some embodiments, the insulation opening 205 may be formed in the slot liners 200 such that, when disposed within the slots 57, the insulation openings do not extend beyond a top end or bottom end of each stator 54 in along the vertical axis 203. In other words, in such embodiments, the insulation opening 205 may be disposed fully within the slots 57 along the vertical axis 203.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. An insulating slot liner for an electric motor, the slot liner comprising:

a body portion having an exterior side configured to be disposed adjacent to an interior surface of a stator of the electric motor and an interior side opposite the exterior side;

a first arm portion and a second arm portion each extending away from the interior side of the body portion so as to form a winding channel between the body portion, the first arm portion, and the second arm portion; and one or more insulation openings formed in the body portion between the interior side and the exterior side so as to form a fluid connection between the winding channel and the interior surface of the stator.

2. The insulating slot liner of claim 1, wherein the body portion extends between a first end and a second end along a vertical axis, and wherein the one or more insulation openings are disposed spaced from one another in an array along the vertical axis.

3. The insulating slot liner of claim 1, wherein the body portion extends between a first end and a second end along a vertical axis, and wherein the one or more insulation openings each have an opening height measured along the vertical axis that is less than an opening width measured perpendicular to the vertical axis.

4. The insulating slot liner of claim 1, wherein the body portion extends between a first end and a second end along a vertical axis, and wherein the one or more insulation openings each have an opening height measured along the vertical axis that is greater than or equal to an opening width measured perpendicular to the vertical axis.

5. The insulating slot liner of claim 1, wherein the first arm portion is configured to be disposed adjacent a first stator tooth of the electric motor, and wherein the second arm portion is configured to be disposed adjacent a second stator tooth of the electric motor, the second stator tooth being adjacent the first stator tooth.

6. The insulating slot liner of claim 5, wherein the first arm portion includes a distal end that extends away from the first arm portion and the second arm portion includes a distal end that extends away from the second arm portion, and wherein the distal end of the first arm portion is configured to be disposed adjacent a distal end of the first stator tooth and wherein the distal end of the second arm portion is configured to be disposed adjacent a distal end of the second stator tooth.

7. A motor assembly comprising:

a stator having a circumferential interior surface;

a plurality of stator teeth extending radially inward from the interior surface of the stator;

a plurality of slots formed between pairs of adjacent stator teeth and the interior surface of the stator; and a plurality of slot liners, each slot liner of the plurality of slot liners disposed within one of the plurality of slots, wherein each slot liner includes:

a body portion having an exterior side disposed against the interior surface and an interior side opposite the exterior side, a first arm portion disposed against a first stator tooth of the plurality of stator teeth, a second arm portion disposed against a second stator tooth of the plurality of stator teeth, the second stator tooth being adjacent to the first stator tooth, and one or more insulation openings formed in the body portion between the interior side and the exterior side so as to form a fluid connection between each respective slot of the plurality of slots and the interior surface of the stator.

8. The motor assembly of claim 7, wherein the body portion extends between a first end and a second end along a vertical axis, and wherein the one or more insulation openings are disposed spaced from one another in an array along the vertical axis.

9. The motor assembly of claim 7, wherein the body portion extends between a first end and a second end along a vertical axis, and wherein the one or more insulation openings each have an opening height measured along the vertical axis that is less than an opening width measured perpendicular to the vertical axis.

10. The motor assembly of claim 7 further comprising a thermally conductive potting material disposed within at least one of the plurality of slots so as to cover the one or more insulation openings.

11. The motor assembly of claim 7, wherein the body portion extends between a first end and a second end along a vertical axis, and wherein the one or more insulation openings are disposed along the vertical axis so as to not extend beyond each respective stator in the vertical axis.

12. The motor assembly of claim 7, wherein the first arm portion includes a distal end that extends away from the first arm portion and the second arm portion includes a distal end that extends away from the second arm portion, and wherein the distal end of the first arm portion is configured to be disposed adjacent a distal end of a first stator tooth and wherein the distal end of the second arm portion is configured to be disposed adjacent a distal end of a second stator tooth adjacent the first stator tooth.

13. The motor assembly of claim 7 further comprising stator windings disposed around each of the plurality of stator teeth, the stator windings being disposed at least partially within each respective slot of the plurality of slots.

14. The motor assembly of claim 13, wherein the stator windings do not overlap the respective insulation openings in a radial direction.

15. A pump system for pumping a fluid, the pump system comprising:

a pump housing including an inlet conduit configured to convey the fluid into the pump housing and an outlet conduit configured to convey the fluid out of the pump housing;

an electric motor assembly including a stator;

a shaft extending out of the stator and into the pump housing, the electric motor assembly being configured to rotate the shaft with respect to the electric motor and the pump housing;

an impeller disposed on the shaft and within the pump housing in fluid communication with the inlet conduit and the outlet conduit, the impeller being configured to rotate within the pump housing in response to the shaft so as to convey the fluid out of the outlet conduit;

wherein the stator includes:

a plurality of stator teeth extending radially inward and spaced from one another to form a plurality of slots, and a plurality of slot liners each disposed within one of the plurality of slots, each of the plurality of slot liners including one or more insulation openings disposed so as to form a fluid connection between the respective slot and the stator; and a thermally conductive and electrically isolating potting material disposed within at least one of the plurality of slots so as to cover the one or more insulation openings.

16. The pump system of claim 15, wherein each of the plurality of slot liners further comprises:

a body portion having an exterior side disposed against the stator and an interior side opposite the exterior side;

a first arm portion disposed against a first stator tooth of the plurality of stator teeth;

a second arm portion disposed against a second stator tooth of the plurality of stator teeth, the second stator tooth being adjacent to the first stator tooth;

wherein the plurality of insulation openings are formed in the body portion between the interior side and the exterior side.

17. The pump system of claim 16, wherein the first arm portion includes a distal end that extends away from the first arm portion and the second arm portion includes a distal end that extends away from the second arm portion, and wherein the distal end of the first arm portion is configured to be disposed adjacent a distal end of a first stator tooth and wherein the distal end of the second arm portion is configured to be disposed adjacent a distal end of a second stator tooth adjacent the first stator tooth.

18. The pump system of claim 15, wherein the body portion extends between a first end and a second end along a vertical axis, and wherein the one or more insulation openings are disposed along the vertical axis so as to not extend beyond each respective stator in the vertical axis.

19. The pump system of claim 15, wherein the thermally conductive and electrically isolating potting material is disposed within each of the plurality of slots so as to cover each of the one or more insulation openings.

20. The pump system of claim 15, wherein each of the plurality of slot liners extends between a first end and a second end along a vertical axis, and wherein the plurality of insulation openings are disposed spaced from one another in an array along the vertical axis.

* * * * *